United States Patent
Uyeda (10) Patent No.: US 11,957,292 B2
(45) Date of Patent: Apr. 16, 2024

(54) DISHWASHER COVERAGE ALERT SYSTEM AND METHOD

(71) Applicant: Haier US Appliance Solutions, Inc., Wilmington, DE (US)

(72) Inventor: Andrew Uyeda, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 23 days.

(21) Appl. No.: 17/731,709

(22) Filed: Apr. 28, 2022

(65) Prior Publication Data

US 2023/0346192 A1    Nov. 2, 2023

(51) Int. Cl.
| | | |
|---|---|---|
| G06T 7/00 | (2017.01) |
| A47L 15/00 | (2006.01) |
| A47L 15/42 | (2006.01) |
| A47L 15/46 | (2006.01) |
| A47L 15/50 | (2006.01) |
| G06T 11/00 | (2006.01) |
| G06V 20/00 | (2022.01) |
| H04N 5/272 | (2006.01) |
| H04N 7/18 | (2006.01) |

(52) U.S. Cl.
CPC ....... *A47L 15/4295* (2013.01); *A47L 15/0063* (2013.01); *A47L 15/46* (2013.01); *A47L 15/50* (2013.01); *G06T 11/001* (2013.01); *G06V 20/00* (2022.01); *H04N 5/272* (2013.01); *H04N 7/18* (2013.01); *A47L 2401/04* (2013.01); *A47L 2501/36* (2013.01); *G06T 2210/62* (2013.01)

(58) Field of Classification Search
CPC ..... G06T 7/0002; G06T 7/0004; G06T 7/001; G06T 7/73; G06F 18/00; A47L 15/0049; A47L 15/00; A47L 15/0063; A47L 15/50; A47L 15/46
See application file for complete search history.

(56) References Cited

U.S. PATENT DOCUMENTS

| | | | | |
|---|---|---|---|---|
| 2007/0005423 A1* | 1/2007 | Levien | ............... | G06Q 30/0267 705/14.69 |
| 2007/0107754 A1* | 5/2007 | Jeong | .................. | A47L 15/4293 134/184 |

(Continued)

FOREIGN PATENT DOCUMENTS

| | | |
|---|---|---|
| CN | 107977080 B | 3/2021 |
| KR | 20180044553 A | 5/2018 |
| WO | WO2021170404 A1 | 9/2021 |

*Primary Examiner* — Hau H Nguyen
(74) *Attorney, Agent, or Firm* — Dority & Manning, P.A.

(57) ABSTRACT

An article-distribution system for a dishwasher is provided having a camera assembly directed at a rack assembly of the dishwasher, a display screen spaced apart from the rack assembly, and a controller in operative communication with the camera assembly and the display screen. The controller may be configured to direct a dishwasher coverage operation. The dishwasher coverage operation may include receiving an image of the rack assembly from the camera assembly, identifying an uncleanable article, presenting the image at the display screen, and overlaying an identifier onto the presentation of the image based on the identified uncleanable article. The step of identifying the uncleanable article may be based on the received image. The uncleanable article may be in in an uncleanable position within the rack assembly.

16 Claims, 7 Drawing Sheets

(56) References Cited

U.S. PATENT DOCUMENTS

2021/0093150 A1    4/2021  Shin et al.
2021/0093154 A1*   4/2021  Boyer ................. A47L 15/4295
2021/0121038 A1    4/2021  Heidel et al.
2021/0127943 A1*   5/2021  Ha ........................ A47L 15/427

* cited by examiner

DISHWASHER COVERAGE ALERT SYSTEM AND METHOD

FIELD OF THE INVENTION

The present subject matter relates generally to appliances, and more particularly to dishwasher appliances.

BACKGROUND OF THE INVENTION

Dishwashers are generally useful household appliances with a cabinet and a door allowing selective admittance into the cabinet. Inside the cabinet are usually at least one rack assembly for holding articles (e.g., dishes, plates, cups, silverware, etc.) for washing, and at least one spray assembly configured to apply wash fluids onto the rack assembly and any articles placed thereon. Different wash patterns and spray assembly configurations allow for articles to be washed in a variety of configurations within the rack assembly.

Challenges exist in that, even with the varied configurations for spray assemblies, articles may sometimes be placed in a way that the dishwasher may be able to wash those articles only partially. For example, articles touching and overlapping each other may be incompletely washed by spray assemblies. Generally, spray assemblies have a set spray pattern or motion (e.g., spraying up into a rack assembly or spraying down onto a rack assembly, with optional rotation) during washing. Unfortunately, poor, or inappropriate placement of an article (e.g., outside of the set spray pattern of the spray assembly) by a user within a dishwasher can result in a partial or incomplete washing of that article (e.g., separate from or in addition to overlapping article placement).

Accordingly, a way to improve the placement of articles within rack assemblies in a dishwasher would be desirable. Additionally or alternatively, a way to alert or guide a user when an article is in a favorable or unfavorable position within the dishwasher would be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an article-distribution system for a dishwasher is provided. The article-distribution system may include a camera assembly directed at a rack assembly of the dishwasher, a display screen spaced apart from the rack assembly, and a controller in operative communication with the camera assembly and the display screen. The controller may be configured to direct a dishwasher coverage operation. The dishwasher coverage operation may include receiving an image of the rack assembly from the camera assembly, identifying an uncleanable article, presenting the image at the display screen, and overlaying an identifier onto the presentation of the image based on the identified uncleanable article. The step of identifying the uncleanable article may be based on the received image. The uncleanable article may be in in an uncleanable position within the rack assembly.

In another exemplary aspect of the present disclosure, a method of directing a dishwasher coverage operation is provided. The method may include the steps of receiving an image of a rack assembly from a camera assembly, identifying an uncleanable article, presenting the image at a display screen, and overlaying an identifier onto the presentation of the image based on the identified uncleanable article. The step of identifying an uncleanable article may be based on the received image. The uncleanable article may be in an uncleanable position within the rack assembly. The camera assembly may be directed at the rack assembly. The display screen may be spaced apart from the rack assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same of similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "cleaning cycle" is intended to refer to one or more periods of time that may include a wash cycle, rinse cycle, or a drain cycle. The term "wash fluid" refers to a liquid used for washing or rinsing the articles and is typically made up of water that may include other additives such as detergent or other treatments.

The present disclosure advantageously provides a system that may promote proper dishwasher loading. Systems and methods described herein may predict if certain dishes placed within a dishwasher appliance will be cleaned. Embodiments disclosed herein may aid in training users of dishwasher appliances to properly load the dishwasher appliance. Further, embodiments may inform which dishes placed in a dishwasher will be cleaned. Benefits may include increased durability, performance, or lifetime of dishwasher appliances that use the methods disclosed herein or are included in the systems disclosed herein. In some cases, users may find increased satisfaction with the systems and methods disclosed herein. Systems and methods discussed herein may include detection or identification of which articles within the dishwasher will be cleaned during a cycle and which articles will not be cleaned during a cycle of the dishwasher appliance.

Figure 1:
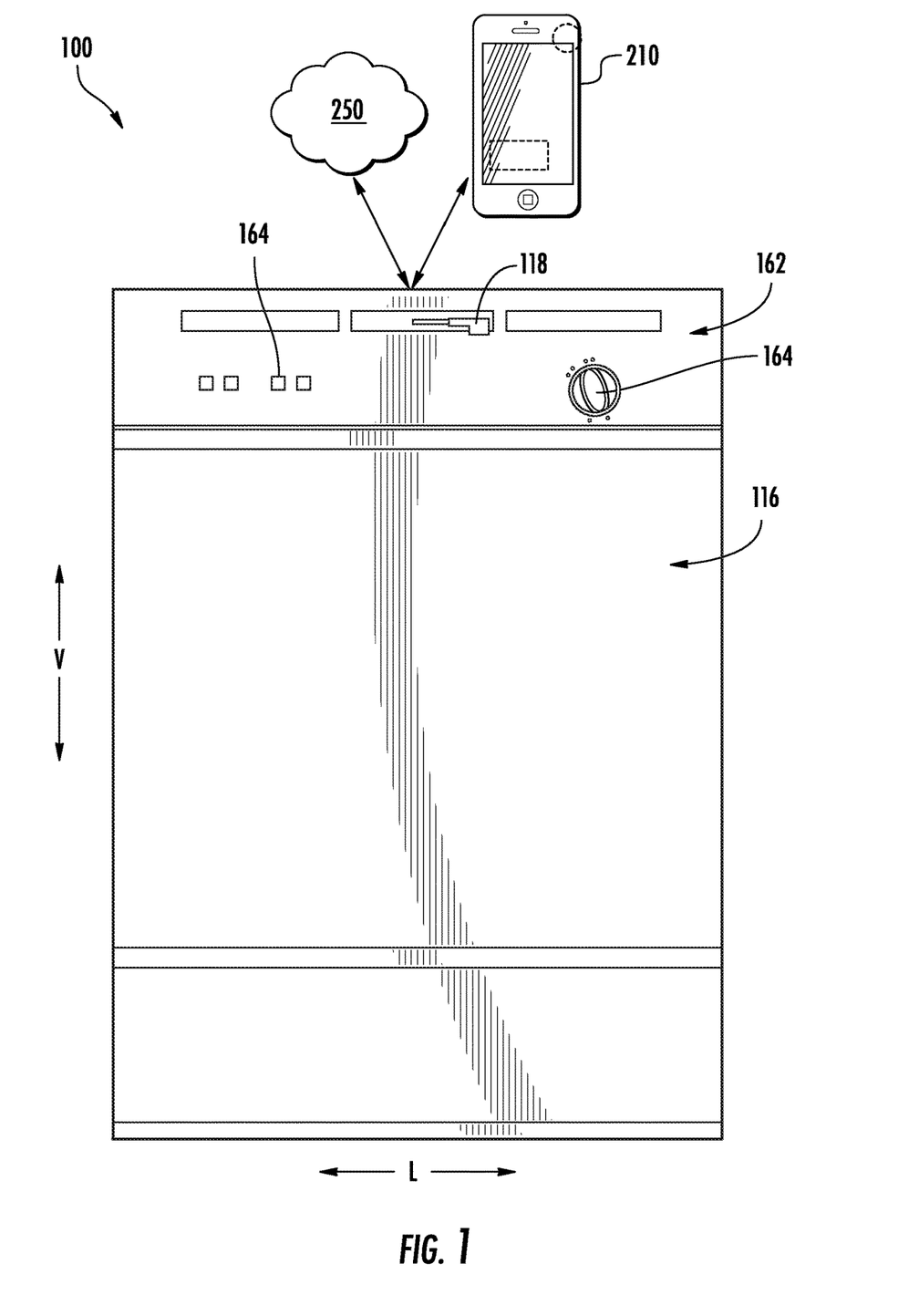
FIG. 1 provides a perspective view of a system with a dishwasher according to exemplary embodiments of the present disclosure.
Figure 2:
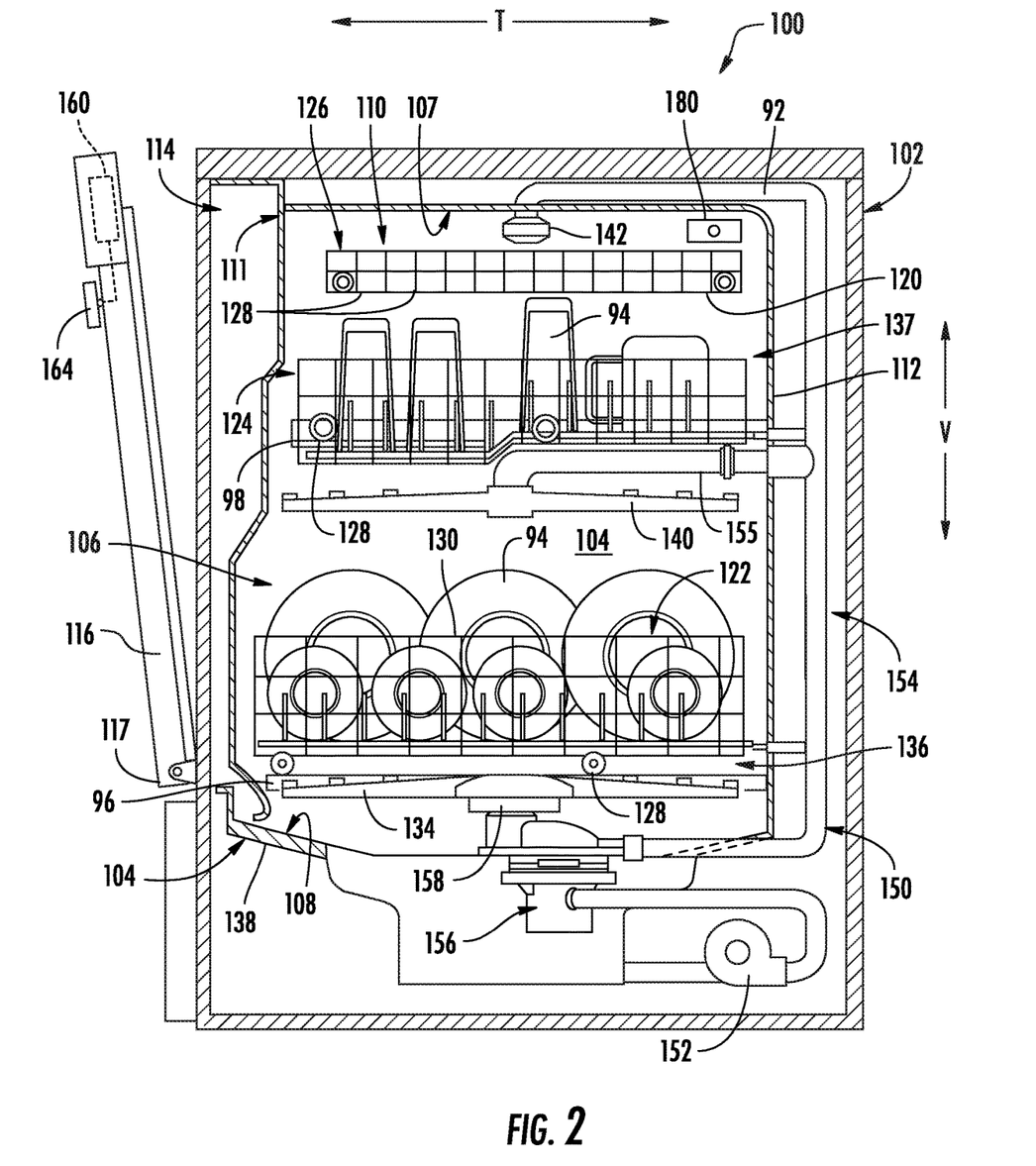
FIG. 2 provides a side, cross sectional view of an exemplary embodiment of a dishwasher appliance of the present disclosure.

FIGS. 1 and 2 depict an exemplary domestic dishwashing appliance 100 that may be configured in accordance with aspects of the present disclosure. FIG. 1 further includes a system, which will be discussed in more detail below. For the particular embodiment of FIGS. 1 and 2, the dishwasher 100 includes a cabinet 102 having a tub 104 therein that defines a wash chamber 106 for receipt of articles 94 for washing. As shown in FIG. 2, tub 104 extends between a top 107 and a bottom 108 along a vertical direction V, between a pair of opposing side walls 110 along a lateral direction L, and between a front side 111 and a rear side 112 along a transverse direction T. Each of the vertical direction V, lateral direction L, and transverse direction T are mutually perpendicular to one another.

The tub 104 includes a front opening 114 and a door 116 hinged at its bottom 117 for movement between a normally closed vertical position (shown in FIG. 1) wherein the wash chamber 106 is sealed shut for washing operation and a horizontal open position for loading and unloading articles 94 from dishwasher 100. According to exemplary embodiments, dishwasher appliance 100 further includes a door closure mechanism or assembly 118 that is used to lock and unlock door 116 for accessing and sealing wash chamber 106.

At least one rack assembly is slidably positioned within wash chamber 106 and is configured for the receipt of articles for washing. For the exemplary embodiment shown in FIG. 2, opposing tub side walls 110 accommodate a plurality of rack assemblies 122, 124, 126. Guide rails 96, 98, and 120 may be mounted to (or formed as part of) side walls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack 122, 124, 126 is adapted for movement between an extended loading position (not shown) in which the rack is substantially positioned outside the wash chamber 106. This may be facilitated, for example, by rollers 128 mounted onto rack assemblies 122, 124, 126, respectively.

Some or all of the rack assemblies 122, 124, 126 may be fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles 94 within wash chamber 106 while allowing a flow of wash fluid to reach and impinge on those articles, e.g., during a cleaning or rinsing cycle. For some embodiments, a silverware basket (not shown) is removably attached to a rack assembly, e.g., lower rack assembly 122, for placement of silverware, utensils, and the like, which are otherwise too small or delicate to be accommodated by rack 122.

At least one spray assembly is located in wash chamber 106 and is configured to direct wash fluids onto at least on rack assembly for washing articles located therein. For the exemplary embodiment of FIG. 2, dishwasher appliance 100 further includes a plurality of spray assemblies 134, 140, and 142 for urging a flow of water or wash fluid onto the articles placed within wash chamber 106. More specifically, as illustrated in FIG. 2, dishwasher appliance 100 includes a first spray assembly 134 (also referred to as a lower spray arm assembly 134) disposed in a lower region 136 of wash chamber 106 and above a sump 138 so as to rotate in relatively close proximity to lower rack assembly 122. Similarly, a second spray assembly 140 (also referred to as a mid-level spray arm assembly 140) is located in an upper region 137 of wash chamber 106 and may be located below and in close proximity to middle rack assembly 124. In this regard, mid-level spray arm assembly 140 may generally be configured for urging a flow of wash fluid up through middle rack assembly 124 and third rack assembly 126. Additionally, an upper or third spray assembly 142 (also referred to as an upper spray assembly 142) may be located above upper or third rack assembly 126 along the vertical direction V. In this manner, third spray assembly 142 may be configured for urging or cascading a flow of wash fluid downward over rack assemblies 122, 124, and 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water or wash fluid from pump 152 to the various spray assemblies and manifolds. For example, as illustrated in FIG. 2, a primary supply conduit 154 may extend from pump 152, along rear side 112 of tub 104 along the vertical direction V to supply wash fluid throughout wash chamber 106. In some examples, a secondary supply conduit 92 may supply additional wash fluid to one or more various spray assemblies and manifolds. A diverter assembly 156 can allow selection between spray assemblies 134 and 140, 142 being supplied with wash fluid. However, it should be appreciated that according to alternative embodiments, any other suitable plumbing configuration may be used to supply wash fluid throughout the various spray manifolds and assemblies described herein.

Each spray assembly 134, 140, 142 or other spray device may include an arrangement of discharge ports or orifices for directing wash fluid received from pump 152 onto dishes or other articles 94 located in wash chamber 106. The arrangement of the discharge ports, also referred to as jets, apertures, or orifices, may provide a rotational force by virtue of wash fluid flowing through the discharge ports. Alternatively, spray assemblies 134, 140, 142 may be motor-driven, or may operate using any other suitable drive mechanism. Spray manifolds and assemblies may also be stationary. Movement of the spray arm assemblies 134 and 140 and the spray from fixed manifolds like spray assembly 142 provides coverage of dishes, silverware, and other dishwasher contents and articles 94 to be cleaned with a washing spray. Other configurations of spray assemblies may be used as well. For example, dishwasher appliance 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

Figure 3:
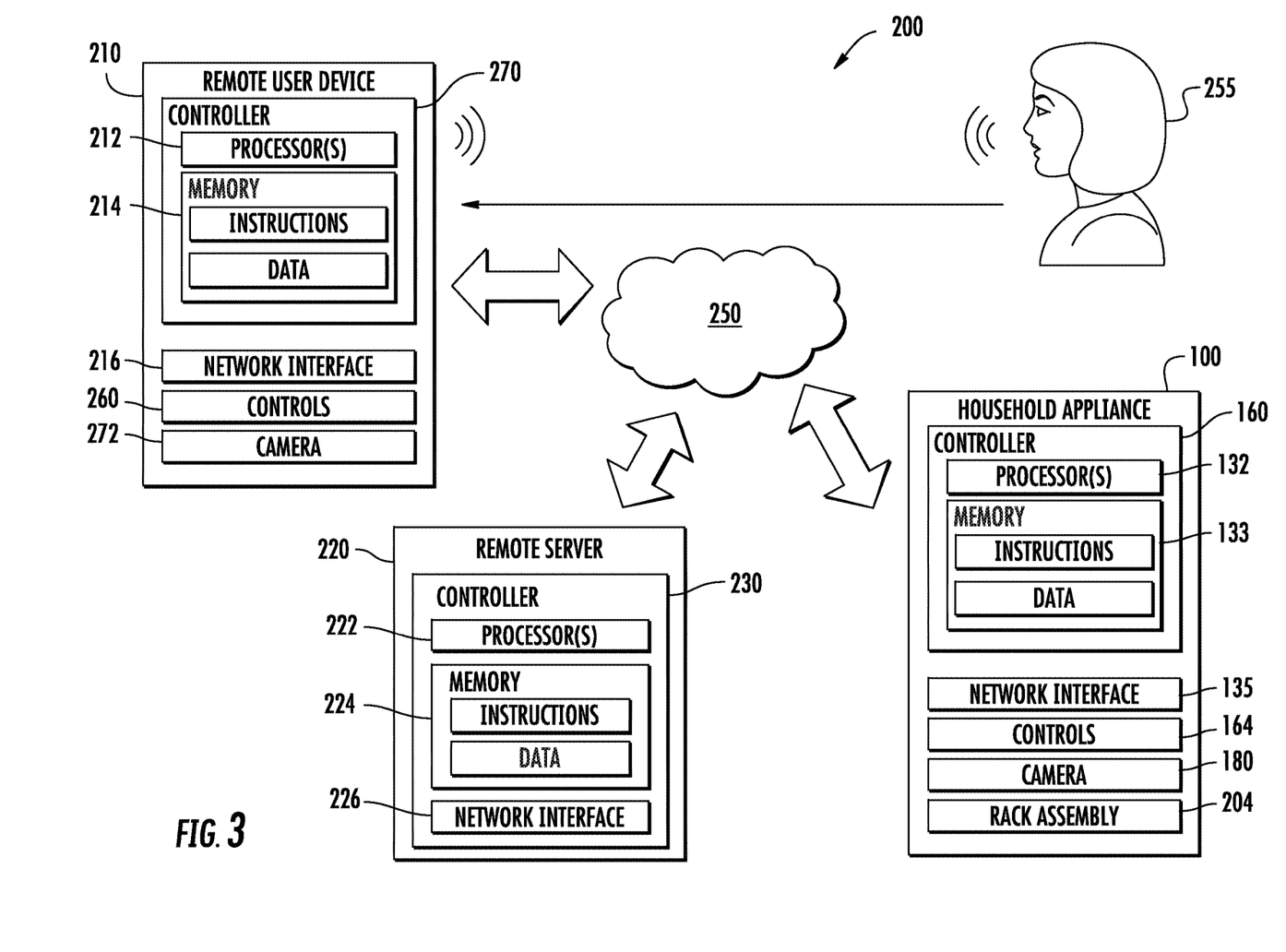
FIG. 3 provides a schematic view of an exemplary system according to exemplary embodiments of the present disclosure.

The dishwasher appliance 100 is further equipped with a controller 160 (FIG. 2) to regulate or facilitate operation of the dishwasher appliance 100. Controller 160 may include one or more memory devices (e.g., memory 133 in FIG. 3) and one or more microprocessors, such as general or special purpose microprocessors operable to execute programming instructions or micro-control code associated with operation of appliance 100 (e.g., in FIG. 3, shown as "instructions" and "data" with memory 134, and a processor 132 in controller 160). The memory may represent random access memory such as DRAM or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog or digital logic circuitry (such as switches, amplifiers, integrators, comparators, flip-flops, AND gates, and the like) to perform control functionality instead of relying upon software.

The controller 160 may be positioned in a variety of locations throughout dishwasher appliance 100. In the illustrated embodiment, the controller 160 may be located within a control panel area 162 of door 116. In such an embodiment, input/output ("I/O") signals may be routed between the control system and various operational components of dishwasher appliance 100 along wiring harnesses that may be routed through the bottom of door 116. Typically, the controller 160 includes a user interface panel/controls 164 (FIG. 1) through which a user may select various operational features and modes and monitor progress of the dishwasher appliance 100. In one embodiment, the user interface 164 may represent a general purpose I/O ("GPIO") device or functional block. In one embodiment, the user interface 164 may include input components, such as one or more of a variety of electrical, mechanical, or electro-mechanical input devices including rotary dials, push buttons, and touch pads. The user interface 164 may include a display component, such as a digital or analog display device designed to provide operational feedback to a user. For example, user interface 164 may be provided on controller 160 and may include one or more status lights, screens, or visible indicators. According to exemplary embodiments, user interface 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays. The user interface 164 may be in communication with the controller 160 via one or more signal lines or shared communication busses.

The memory devices may also store data that can be retrieved, manipulated, created, or stored by the one or more processors or portions of controller 160. The data can include, for instance, data to facilitate performance of methods described herein. The data can be stored locally (e.g., on controller 160) in one or more databases or may be split up so that the data is stored in multiple locations. In addition, or alternatively, the one or more database(s) can be connected to controller 160 through any suitable network(s), such as through a high bandwidth local area network (LAN) or wide area network (WAN). In this regard, for example, controller 160 may further include a communication module or interface that may be used to communicate with one or more other component(s) of appliance 100, controller 160, an external appliance controller, or any other suitable device, e.g., via any suitable communication lines or network(s) and using any suitable communication protocol. The communication interface can include any suitable components for interfacing with one or more network(s) (e.g., remote network 250), including for example, transmitters, receivers, ports, controllers, antennas, or other suitable components. In this manner, controller 160 may further be in communication (e.g., wireless communication) with a remote user device 210, in some embodiments, and as will be described herein.

The controller 160 may be programmed to operate the respective appliance 100 by executing instructions stored in memory. For example, the instructions may be software or any set of instructions that when executed by the processing device, cause the processing device to perform operations. Controller 160 can include one or more processor(s) and associated memory device(s) configured to perform a variety of computer-implemented functions or instructions (e.g. performing the methods, steps, calculations and the like and storing relevant data as disclosed herein). It should be noted that controller 160 as disclosed herein is capable of and may be operable to perform any methods and associated method steps (e.g., as, or as part of, a commissioning operation) as disclosed herein.

In some embodiments, appliance 100 (e.g., by use of controller 160) may further be configured to communicate with one or more separate, external devices, such as a remote user device (remote user device 210) or a remote server (e.g. remote server 220 in FIG. 3). Such communication may be performed either directly or via one or more intermediate networks (e.g., a wide area network 250, such as the internet), as will be discussed in more detail below.

It should be appreciated that the invention is not limited to any particular style, model, or configuration of dishwasher appliance 100. The exemplary embodiment depicted in FIGS. 1 and 2 is for illustrative purposes only. For example, different locations may be provided for user interface 164, different configurations, including providing one or more rack assemblies 122, 124, 126 and one or more spray assemblies 134, 140, 142, to dishwasher appliance 100 may be used, different configurations may be provided for rack assemblies 122, 124, 126, different spray assemblies 134, 140, 142 and spray manifold configurations may be used, and other differences may be applied while remaining within the scope of the present subject matter.

Turning generally to FIG. 3, article-distribution system 200 is depicted including a household appliance 100, a camera assembly (e.g., a camera assembly 180 or a camera assembly 272), and a controller in operative communication with the camera assembly (e.g., controller 160 or a controller 270). In some embodiments, the system further includes a remote user device 210, and wide area network 250. In some embodiments, article-distribution system 200 further includes a remote server 220.

Camera assembly 180 is generally directed at a rack assembly 204 or articles 94 placed thereon. Rack assembly 204 may, for example, include or be provided as one of the above-described rack assemblies 122, 124, or 126 in dishwasher 100. In some embodiments, more than one camera assembly 180 may be placed in dishwasher appliance 100, such as one camera assembly for each rack assembly, each camera assembly directed at a corresponding rack assembly. Camera assembly 180 may be configured to capture images of a portion of household appliance 100, as will be described in more detail below. For example, camera assembly 180 may be directed at cabinet 102 to capture an image of rack assembly 204 or the articles 94 placed thereon. As shown, camera assembly 180 may be a part of household appliance 100 (e.g., as shown in FIG. 2).

Generally, camera assembly 180 may be any type of device suitable for capturing at least one image or video. As an example, camera assembly 180 may be a video camera or a digital camera with an electronic image sensor [e.g., a charge coupled device (CCD) or a CMOS sensor]. Although the term "image" is used herein, it should be appreciated that according to exemplary embodiments, camera assembly 180 may take any suitable number or sequence of two-dimensional images, videos, or other visual representations of cabinet 102 or items (e.g., articles) positioned therein. For example, the one or more images may include a video feed, or a series of sequential static images obtained by camera assembly 180 that may be transmitted to controller 160 (e.g., as a data signal) for analysis or other manipulation. In some embodiments, camera assembly 180 transmits images or video feed directly to remote user device 210 (e.g., through wireless signal). Optionally, one or more light sources (not shown) may be provided with or adjacent to the camera assembly 180. During use, camera assembly 180 may take images or video feed in coordination with the light sources such as to obtain higher quality or truer-to-color images of cabinet 102 or items therein or thereon.

In some embodiments, controller 160 includes a network interface 135 such that appliance 100 can connect to and communicate over one or more networks (e.g., network 250) with one or more network nodes. Network interface 135 can be an onboard component of controller 160 or it can be a separate, off board component. Controller 160 can also include one or more transmitting, receiving, or transceiving components for transmitting/receiving communications with other devices communicatively coupled across network 250. Additionally or alternatively, one or more transmitting, receiving, or transceiving components can be located off board controller 160.

Referring still to FIG. 3, a schematic diagram of article-distribution system 200 will be described according to an exemplary embodiment of the present subject matter. In general, item-management article-distribution system 200 may be configured for interaction, data transfer, and other communications between appliance 100 and one or more external devices. For example, this communication may be used to provide and receive an image of at least one rack assembly (e.g., rack assembly 204) or articles 94 placed thereon. In addition, it should be appreciated that article-distribution system 200 may be used to transfer data or other information to one or more external devices or appliances.

For example, item-management article-distribution system 200 permits controller 160 of appliance 100 to communicate with a separate device external to appliance 100, such as remote user device 210, remote server 220, or another household appliance (such as another appliance within a household where appliance 100 resides). As described in more detail below, these communications may be facilitated using a wired or wireless connection, such as via a network 250.

In general, remote user device 210 may be any suitable device separate from appliance 100 that is configured to provide or receive communications, information, data, or commands from a user. In this regard, remote user device 210 may be, for example, a personal phone, a smartphone, a tablet, a laptop or personal computer, a wearable device, a smart home system, or another mobile or remote device.

In some embodiments, remote user device 210 may include a controller 270 and a network interface 216. Controller 270 may include one or more processors 212 and one or more memory devices 214 (i.e., memory). The one or more processors 212 can be any suitable processing device (e.g., a processor core, a microprocessor, an ASIC, a FPGA, a microcontroller, etc.) and can be one processor or a plurality of processors that are operatively connected. The memory device 214 can include one or more non-transitory computer-readable storage mediums, such as RAM, ROM, EEPROM, EPROM, flash memory devices, magnetic disks, etc., and combinations thereof. The memory devices 214 can store data and instructions that are executed by the processor 212 to cause the remote user device 210 to perform operations. For example, instructions could be instructions for receiving images from a camera assembly of the system (e.g., a camera assembly 272 or camera assembly 180), directing a response action at household appliance 100, displaying an alert on a display of remote user device 210, downloading software applications, implementing software applications, etc. The memory devices 214 may also include data, such as identification data corresponding to the individual remote user device 210, stored blockchain files, stored software files, etc., that can be retrieved, manipulated, created, or stored by processor 212.

Remote user device 210 includes a network interface 216 such that remote user device 210 can connect to and communicate over one or more networks (e.g., network 250) with one or more network nodes. Network interface 216 can be an onboard component of controller 270 or it can be a separate, off board component. Controller 270 can also include one or more transmitting, receiving, or transceiving components for transmitting/receiving communications with other devices communicatively coupled across network 250. Additionally or alternatively, one or more transmitting, receiving, or transceiving components can be located off board controller 270.

In some embodiments, remote user device 210 includes a camera assembly 272. Remote user device 210 is generally movable relative to appliance 100 or rack assembly 204. In turn, camera assembly 272 can be directed at rack assembly 204 or articles 94 placed thereon. Camera assembly 272 may be configured to capture images of a portion of household appliance 100, as will be described in more detail below. For example, camera assembly 272 may be directed at cabinet 102 to capture an image of rack assembly 204 or the articles 94 placed thereon.

Generally, camera assembly 272 may be any type of device suitable for capturing at least one image or video. As an example, camera assembly 272 may be a video camera or a digital camera with an electronic image sensor [e.g., a charge coupled device (CCD) or a CMOS sensor]. Although the term "image" is used herein, it should be appreciated that according to exemplary embodiments, camera assembly 272 may take any suitable number or sequence of two-dimensional images, videos, or other visual representations of rack assembly 204 or items (e.g., articles) positioned therein. For example, the one or more images may include a video feed, or a series of sequential static images obtained by camera assembly 272 that may be transmitted to a controller (e.g., controller 270) for analysis or other manipulation. Optionally, one or more light sources (not shown) may be provided with or adjacent to the camera assembly 272. During use, camera assembly 272 may take images or video feed in coordination with the light sources such as to obtain higher quality or truer-to-color images of cabinet 102 or items therein or thereon.

Figure 6:
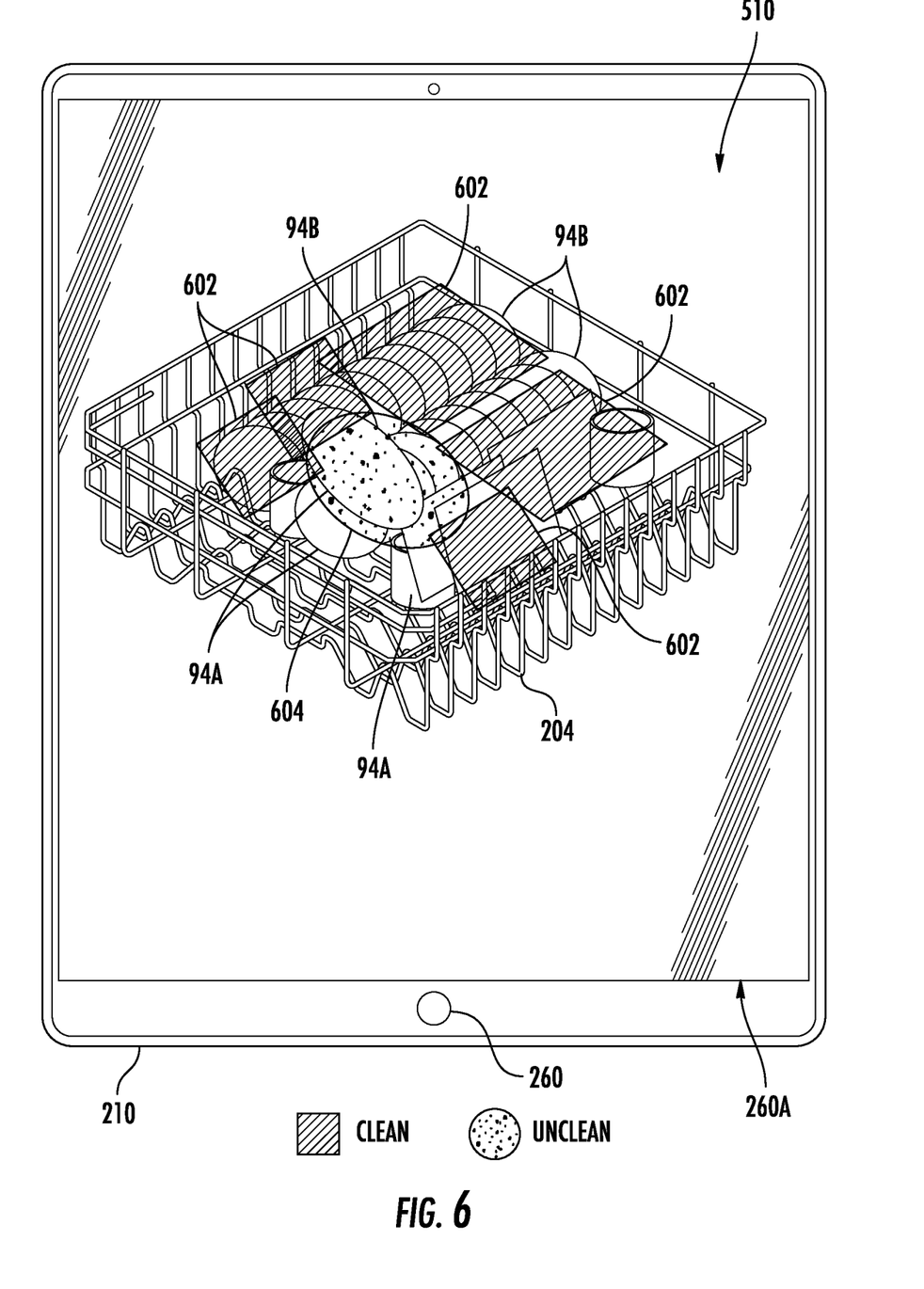
FIG. 6 provides a perspective view of an exemplary remote user device displaying the exemplary image of FIG. 5.
Figure 7:
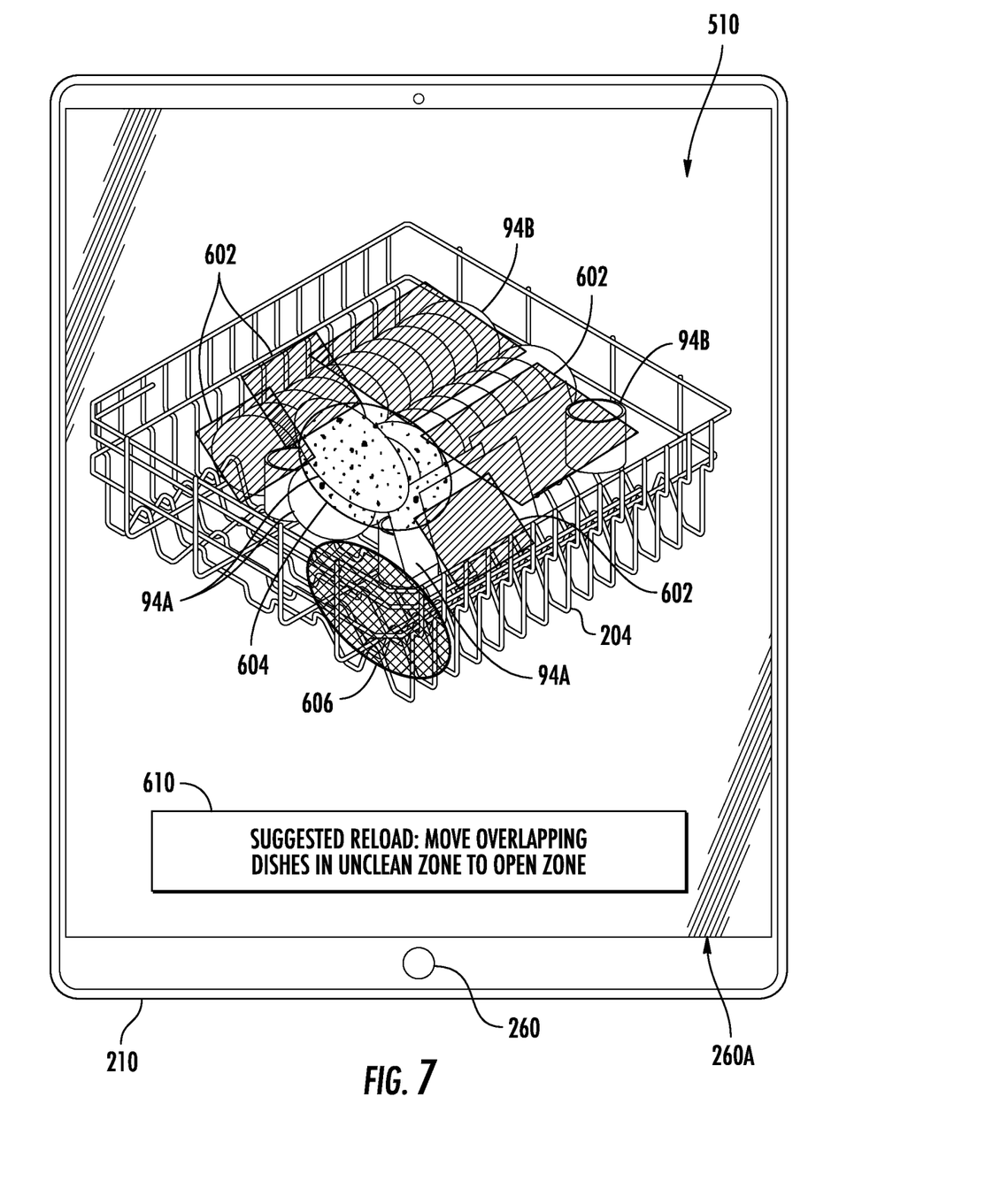
FIG. 7 provides an alternative perspective view of an exemplary remote user device displaying the exemplary image of FIG. 5.

According to the arrangement, remote user device 210 may further include controls 260. Controls 260 may allow for user inputs, as will be described herein. Camera assembly 272 or controls 260 may have various arrangements, as otherwise understood. In some embodiments controls 260 may include a remote user display, the remote user display being manipulatable by the user to send inputs to the system, as would be understood. For example, controls 260 may include a display screen (e.g., display 260A in FIGS. 6 and 7), including a touchscreen, buttons, or other controls such that user instructions may be received by way of controls 260 to controller 270 of remote user device. Further, a display (e.g., display 260A as shown in FIGS. 6 and 7) may be used to send or display information to a user as will be described in more detail below.

In certain embodiments, a remote server 220 is in communication with appliance 100 or remote user device 210 through network 250. In this regard, for example, remote server 220 may be a cloud-based server 220, and is thus located at a distant location, such as in a separate state, country, etc. According to an exemplary embodiment, remote user device 210 may communicate with a remote server 220 over network 250, such as the Internet, to transmit/receive data or information, provide user inputs, receive user notifications or instructions, interact with or control appliance 100, etc. In addition, remote user device 210 and remote server 220 may communicate with appliance 100 to communicate similar information.

In general, communication between appliance 100, remote user device 210, remote server 220, or other user devices or appliances may be carried using any type of wired or wireless connection and using a suitable type of communication network, non-limiting examples of which are provided below. For example, remote user device 210 may be in direct or indirect communication with appliance 100 through any suitable wired or wireless communication connections or interfaces, such as network 250. For example, network 250 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 220, such as a web server, is in operative communication with remote user device 210. The remote server 220 can be used to host an information database (e.g., software applications.). The server 220 can be implemented using any suitable computing device(s). In some embodiments, server 220 includes a controller 230. Controller 230 may include one or more processors 222 and one or more memory devices 224 (i.e., memory). The one or more processors 222 can be any suitable processing device (e.g., a processor core, a microprocessor, an ASIC, a FPGA, a microcontroller, etc.) and can be one processor or a plurality of processors that are operatively connected. The memory device 224 can include one or more non-transitory computer-readable storage mediums, such as RAM, ROM, EEPROM, EPROM, flash memory devices, magnetic disks, etc., and combinations thereof. The memory devices 224 can store data and instructions which are executed by the processor 222 to cause remote server 220 to perform operations. For example, instructions could be instructions for receiving, interpreting, or sending an image file, downloading software applications, implementing software applications, etc. The data can be stored in one or more databases. The one or more databases can be connected to remote server 220 by a high bandwidth LAN or WAN or can also be connected to remote server 220 through network 250. The one or more databases can be split up so that they are located in multiple locales.

Remote server 220 includes a network interface 226 such that remote server 220 can connect to and communicate over one or more networks (e.g., network 250) with one or more network nodes. Network interface 226 can be an onboard component or it can be a separate, off board component. In turn, remote server 220 can exchange data with one or more nodes over the network 250. In particular, remote server 220 can exchange data with remote user device 210. Although not pictured, it is understood that remote server 220 may further exchange data with any number of client devices over the network 250. The client devices can be any suitable type of computing device, such as a general-purpose computer, special purpose computer, laptop, desktop, integrated circuit, mobile device, smartphone, tablet, or other suitable computing device.

Article-distribution system 200 is described herein according to an exemplary embodiment of the present subject matter. However, it should be appreciated that the exemplary functions and configurations of article-distribution system 200 provided herein are used only as examples to facilitate description of aspects of the present subject matter. System configurations may vary, including a system where appliance 100 is not a device communicative with wireless network 250, remote user device 210, or remote server 220. These variations and modifications are contemplated as within the scope of the present subject matter. For example, an article-distribution system 200 including a dishwasher 100 with no camera 180 and a remote user device with a camera 272 are envisioned within the scope of this disclosure. An optional wireless network 250 or a remote server 220 may further be used to facilitate instructions and methods for article-distribution system 200 as described herein.

Figure 4:
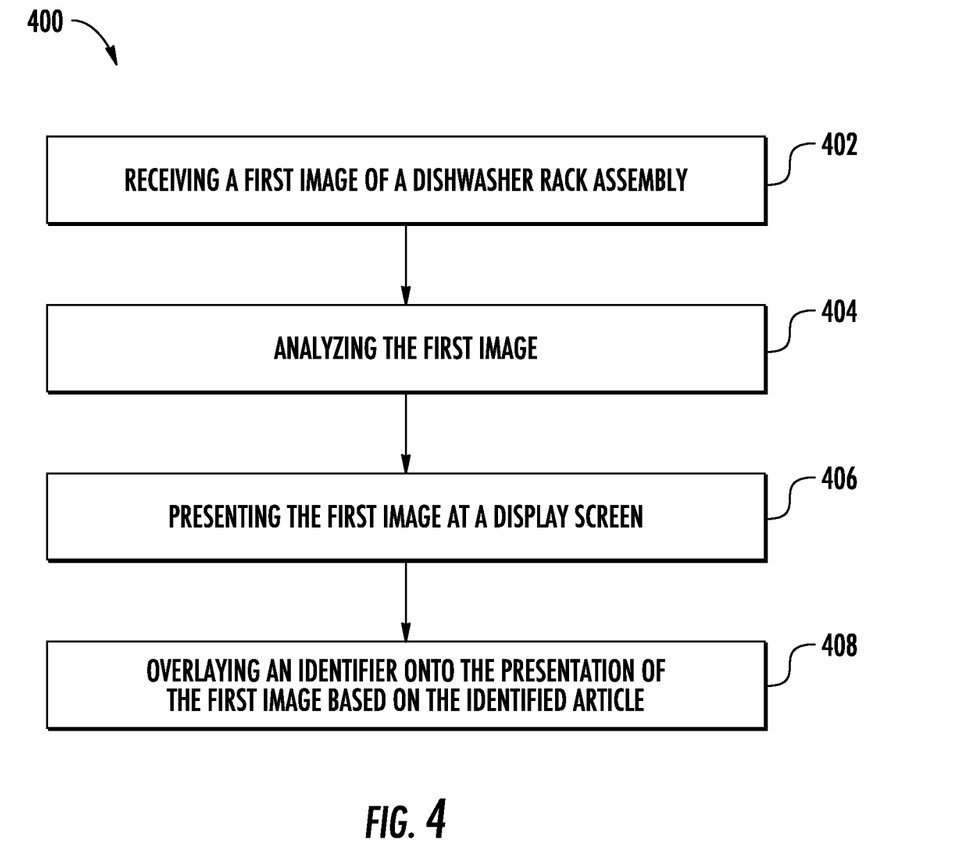
FIG. 4 provides a flow chart illustrating a method of operating a dishwasher coverage operation according to exemplary embodiments of the present disclosure.
Figure 5:
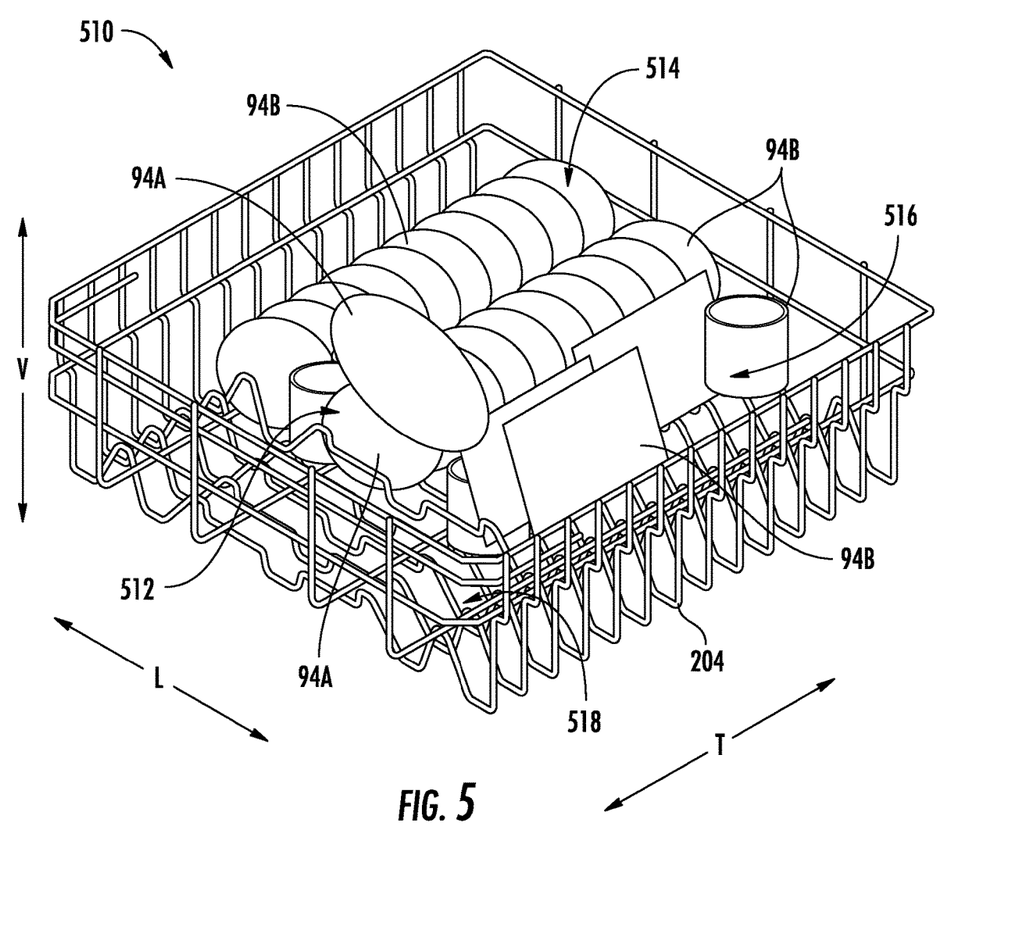
FIG. 5 provides a perspective view of an image of a dishwasher according to exemplary embodiments of the present disclosure.

Turning to FIGS. 4 through 7, FIG. 4 depicts a method of directing a dishwasher coverage operation that may be performed (e.g., in whole or in part) by any of the recited controllers (controller 160, controller 270, or controller 230) in operable communication with one or more camera assembly (e.g., camera 272 or camera 180), as described above. FIGS. 5 through 7 will aid in the description of the method shown in FIG. 4. Generally, FIG. 5 depicts an image of dishwasher rack assembly 204 with articles 94A, 94B thereon. FIG. 6 shows remote user device 210 with an image overlayed with zones as will be described in more detail. FIG. 7 depicts remote user device 210 with an image overlayed with an additional zone to those shown in FIG. 6, as will be described in more detail. It is noted that FIG. 4 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

Method 400 of directing a dishwasher coverage operation includes at step 402, receiving an image of a dishwasher rack assembly. For example, a controller may receive an image of a dishwasher rack assembly (e.g., rack assembly 204) taken by a camera assembly (e.g., camera 180 or camera 272). One or more articles 94 for washing may be placed on the rack assembly. An example image 510 is shown in FIG. 5, with image 510 a rack assembly 204 and article 94A and articles 94B. In FIG. 5, the image shows articles 94A and 94B within the rack assembly 204.

At step 404, the method 400 includes analyzing the image received. For example, step 404 may include determining one or more article positions based on the received image. In other words, analyzation of the received image may result in a determination of one or more article positions. In some embodiments, the image is analyzed by a controller such as controller 160, 230 or 270, or a combination of controllers.

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities or differences between the reference image and the obtained image may be used to extract useful information for improving appliance performance.

According to exemplary embodiments, image processing may include blur detection algorithms that are generally intended to compute, measure, or otherwise determine the amount of blur in an image. For example, these blur detection algorithms may rely on focus measure operators, the Fast Fourier Transform along with examination of the frequency distributions, determining the variance of a Laplacian operator, or any other methods of blur detection known by those having ordinary skill in the art. In addition, or alternatively, the image processing algorithms may use other suitable techniques for recognizing or identifying items or objects, such as edge matching or detection, divide-and-conquer searching, greyscale matching, histograms of receptive field responses, or another suitable routine (e.g., executed at the controller 160 based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In addition to the image processing techniques described above, the image analysis may include utilizing artificial intelligence ("AI"), such as a machine learning image recognition process, a neural network classification module, any other suitable artificial intelligence (AI) technique, or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor articles in a rack assembly of a dishwasher appliance. It should be appreciated that this image analysis or processing may be performed locally (e.g., by controller 160, 230 or 270) or remotely (e.g., by offloading image data to a remote server 220 or network 250).

In some embodiments, step 404 includes identifying an article in an uncleanable position. For example, as shown in FIG. 5, at least one article may be identified as uncleanable, such as one of the articles 94A. Hence, at step 404 the method 400 includes identifying an uncleanable article, the uncleanable article (e.g., at least one of articles 94A in a position 512 within rack assembly 204) being in a uncleanable position within the rack assembly. In some embodiments, an article may be identified as in an uncleanable position when an article touches another article. Additional or alternative ways an article may be identified as an uncleanable article or an article in an uncleanable position include identifying an article with a surface to catch liquid facing up in vertical direction V (such as a bowl or cup in an upright position within the rack assembly), an article identified as resting on top of another article (such as when more than one article is placed vertically above another article), articles positioned in a manner known to be unreachable or partially unreachable by at least one spray assembly in the dishwasher, and equivalents. A dishwasher coverage software may aid a controller (such as controller 160, 230 or 270) with a processor (such as processor 132, 212 or 222) in identifying uncleanable articles. Additionally or alternatively, step 404 may include analyzing one or more images to identify at least one article in an uncleanable position.

In additional or alternative embodiments, step 404 includes identifying an article in a cleanable position. For instance, at least one article may be identified as cleanable, such as one of the articles 94B. For example, at step 404 the method 400 may include identifying a cleanable article, the cleanable article (e.g., at least one of articles 94B in positions 514, or 516) being in a cleanable position (e.g., position 514 or 516) within the rack assembly 204. In some embodiments, an article may be identified as being in a cleanable position if it is positioned without touching another article. Additional or alternative ways an article may be identified as a cleanable article or an article in a cleanable position include identifying an article with level surface (such as a bowl or cup in an upside down position, generally not available to hold a liquid), an article identified as aligned one or more wires or elongated members 130 (e.g., a plate placed between two elongated member 130), articles positioned in a manner known to be reachable by at least one spray assembly in the dishwasher, and equivalents. A dishwasher coverage software may aid a controller (such as controller 160, 230 or 270) with a processor (such as processor 132, 222 or 212) in identifying cleanable articles. Additionally or alternatively, step 404 may include analyzing one or more images to identify at least one article in a cleanable position.

In additional or alternative embodiments, step 404 may include identifying an open position within rack assembly within image (e.g., image 510). An open position may be defined as a place within where an article or more than one article may be placed to be cleaned. In some embodiments, an open position may be a location or position within rack assembly 204 where no articles are present. In turn, an open position may be devoid or partially devoid of articles (e.g., articles 94A or 94B) in the image received (e.g., image 510). A dishwasher coverage software may aid a controller (such as controller 160, 230 or 270) with a processor (such as processor 132, 222 or 212) in identifying open positions. Additionally or alternatively, step 404 may include analyzing one or more images to identify at least one open position within rack assembly 204.

In some embodiments, step 404 the method may include identifying more than one article or more than one position (e.g., an uncleanable position, a cleanable position, or an open position). For example, as shown in FIG. 4, articles 94A and articles 94B may be identified in positions 512, 514, 516 within rack assembly 204, articles 94A being identified as uncleanable or position 512 identified as an uncleanable position. Further, articles 94B may be identified as cleanable articles or positions 514, 516 may be identified as a cleanable position. In certain embodiments, all positions or all articles placed within rack assembly 204 in image 510 may be identified (e.g., classified as either cleanable or, alternately, uncleanable). Articles in image 510 within rack assembly 204 may be further identified as cleanable or uncleanable. Positions may be further identified as at least one of cleanable, uncleanable or open positions.

Optionally, at step 404, the method 400 may further include determining an unclean zone within rack assembly 204. For instance, determining an unclean zone may include identifying an area within rack assembly 204 with articles placed therein where at least one article (e.g., article 94A) is in an uncleanable position. In some embodiments, the unclean zone may be determined based on identifying an uncleanable article in an uncleanable position in the image (e.g., image 510). For example, the identified unclean zone may include a position within rack assembly 204 where articles overlap one another (e.g., in vertical direction V), touch each other, or an equivalent configuration, e.g., where articles would be unreachable by fluids motivated through spray assemblies in dishwasher 100. For instance, position 512 may be an uncleanable position and the area directly adjacent to position 512 together with position 512 may be the unclean zone. In this example, multiple articles 94A overlap one another in vertical direction V within rack assembly 204.

Step 404 may also include determining a clean zone within rack assembly 204. In some embodiments, determining a clean zone may include identifying an area within rack assembly 204 where articles placed therein are in a cleanable position. Additionally or alternatively, the clean zone may be determined based on identifying a cleanable article in a cleanable position in the image (e.g., image 510). For example, the identified clean zone may include a position within rack assembly 204 where articles do not overlap (e.g., in vertical direction V), do not touch each other, or an equivalent configuration, e.g., where articles would be reachable by fluids motivated through spray assemblies in dishwasher 100. For instance, position 514 may be a cleanable position and the area directly adjacent to position 514 together with position 512 may be the clean zone. In turn, position 516 may be a cleanable position and the area directly adjacent to position 516 together with position 516 may be a clean zone.

In some embodiments, step 404 may include determining, based on the received image, the open zone, (e.g., at open position 518). The open zone may be a location within the rack assembly 204 devoid of any article, or an open area sized to fit at least one uncleanable article. For example, an open zone would be an area in image 510, such as the area at position 518 in FIG. 5, sized to fit an uncleanable article 94A. The position 518 may be an open zone. Within rack assembly 204, there are no articles (e.g., articles 94) at or directly adjacent to position 518. In certain embodiments, the size of open zone may vary, and may be sized to fit an identified uncleanable article (e.g., at least one uncleanable article 94A) identified in the image.

In some embodiments, a zone may be used instead of an identified position. For instance, at step 404, the method 400 may include identifying a zone (e.g., an unclean zone) based on identifying an article (e.g., an unclean article) in the image (e.g., image 510). Further, in some embodiments, step 404 may include determining every portion of rack assembly 204 is either an unclean zone, a clean zone, or an open zone. For example, the method may include dividing rack assembly 204 into zones equal in size and identifying articles within each zone or the lack of articles within each zone, and classifying articles found as either cleanable or uncleanable. Each zone may be determined based on the type of articles identified in each zone. In certain embodiments, each zone may be formed as an area directly adjacent to and including an article identified in rack assembly. Each article identified may be used to determine a zone surrounding or including each identified article.

At step 406, the method 400 includes presenting the image at a display screen. The display screen may be spaced apart from the rack assembly. In some embodiments, the display screen may be a part of the controls (e.g., controls 260—FIG. 3) of remote user device 210. In some embodiments, the display screen may be a part of the controls (e.g., controls 164—FIG. 3) of a dishwasher appliance (e.g., appliance 100—FIG. 3). Additionally or alternatively, a controller may present the image on a display screen, such as screen or display 260A in FIGS. 6 and 7.

At step 408, the method 400 includes overlaying an identifier onto the presentation of the image (e.g., based on the identified article). An identifier may provide a visual indicator placed on or inserted into the image to indicate whether the articles placed in the rack assembly as depicted in the image are cleanable or uncleanable. For instance, an identifier may include or be provided as a translucent colored pane, digital picture/icon, textbox, or other suitable visual indicator. In turn, identifiers may be seen by the user as a virtual highlight, sticker, written text, or other graphic overlayed onto the image. In some embodiments, overlaying the identifier includes virtually adding a layer on top of or visually forward of the image such that the original image is a lower layer than the identifier overlayed onto the image. In additional or alternative embodiments, overlaying the identifier includes replacing portions of the image with a graphic or other identifier to convey to the user which articles are uncleanable or which articles are cleanable or which areas of the rack assembly are open for the addition of articles to be cleaned.

In some embodiments, overlaying an identifier may include overlaying an identifier to distinguish one or more regions of the image according to the occupation status of such regions (e.g., whether a region is occupied by an article). As an example, a cleanable identifier may be overlayed on an article (i.e., the region in the image occupied by an article) that has been identified as being in a cleanable position (i.e., the identified cleanable article). A cleanable identifier may be provided over an identified cleanable article. For example, if article 94B is identified as a cleanable article, a graphic of a clean article (e.g., a plate, cup, bowl, silverware, etc.) may be overlayed on the image (e.g., image 510), the graphic covering the portion of the image depicting article 94B. In some embodiments, a translucent colored pane may cover the depiction of article 94B. In some embodiments, the identifier may be a generic shape such as a parallelogram, oval, or other two dimensional shape. The identifier may be placed such that the identifier is overlayed over the identified cleanable article. As shown in FIG. 6, the portion of the image 510 that depicts article 94B, which is identified as a cleanable article, is overlayed by cleanable identifier 602. Cleanable identifier is depicted as a patterned parallelogram in FIG. 6. According to the arrangement, a user viewing the image 510 in FIG. 6 with the overlayed cleanable identifiers would be able to understand which articles within rack assembly 204 are cleanable articles, or articles that are placed within dishwasher 100 in a cleanable position, or articles that are not recommended to be adjusted within rack assembly 204 to be cleaned by dishwasher 100.

As an additional or alternative example, an uncleanable identifier may be overlayed on an article (i.e., the region in the image occupied by an article) that has been identified as being in an uncleanable position (i.e., the identified uncleanable article). An uncleanable identifier may be provided over an identified uncleanable article. For example, if article 94A is identified as an uncleanable article, a graphic of a dirty article (e.g., a plate, cup, bowl, or silverware with a picture of dirt placed thereon) may be overlayed on the image, the graphic covering the portion of the image depicting article 94A. In some embodiments, a translucent colored pane may cover the depiction of article 94A. The translucent colored pane may be a different or distinguishable color from that of a cleanable identifier. In some embodiments, the identifier may be a generic shape such as a parallelogram, oval, or other two dimensional shape. The identifier may be placed such that the identifier is overlayed over the identified uncleanable article. As shown in FIG. 6, the portion of the image 510 that depicts 94A, which is identified as an uncleanable article, is overlayed by uncleanable identifier 604. According to the arrangement, a user viewing the image 510 in FIG. 6 with the overlayed unclean identifiers would be able to understand which articles within rack assembly 204 are uncleanable articles, or articles that are placed within dishwasher 100 in an uncleanable position, or articles that are recommended to be adjusted within rack assembly 204 to be cleaned by dishwasher 100.

Optionally, the uncleanable identifier may include or be provided as a zone identifier. An uncleanable zone identifier may be used to indicate that multiple uncleanable articles are adjacent to or overlapping with each other. For example, articles 94A overlap one another, and uncleanable identifier 604 is an uncleanable zone identifier. The uncleanable zone identifier may define a general area where uncleanable articles are identified. An uncleanable zone identifier may be used, for example, to show a group of articles 94A that overlap one another or are touching one another, the mutual positions of articles 94A making the group of articles 94A uncleanable. In some embodiments, a zone identifier may be an identifier applied to multiple adjacent or overlapping articles. These overlapping or adjacent articles may be overlayed with the zone identifier that may form or define a singular visual mass.]

As a further additional or alternative example, a reload identifier may be overlayed on an unoccupied or open region (e.g., in which an uncleanable article may be repositioned or to which an uncleanable article may be moved). A reload identifier may be used to indicate an area within rack assembly 204 that is available for article placement. In some embodiments, the reload identifier may include an area or location within rack assembly 204 where no articles are placed therein. For example, open position 518 in FIG. 6 may be overlayed with a reload identifier, open position 518 is identified as an open position, the reload identifier 606 shown in FIG. 7 indicating on the image 510 that the area within rack assembly covered by reload identifier 606 is a place wherein articles may be placed for washing. A reload identifier may be placed as a general two dimensional shape, as shown in FIG. 7, with a color or pattern unique from that of other identifiers (such as an uncleanable identifier or a cleanable identifier). A translucent colored pane, graphic, or equivalent may be overlayed on image 510 as the reload identifier.

In some embodiments, overlaying the zone identifier onto the presentation of the image includes overlaying a graphic of an avatar of the identified article. For example, a clean icon, such as a graphic star or other clean graphic (i.e., graphic to generally illustrate the clean zone), may overlay image 510 at cleanable identifiers 602 and an uncleanable icon, such as graphic depictions of dirt, may overlay image 510 at uncleanable identifier 604. Graphics of avatars for identifiers may be any appropriate image, including a pictograph, realistic image, or other detail. Graphics of avatars may be overlayed onto image 510 to indicate which articles held within rack assembly 204 are identified as cleanable or uncleanable. For example, a clean dish picture, a dirty dish picture, a graphic indicating cleanness or dirtiness, a happy face, or a sad face, or any equivalent graphic to differentiate or otherwise inform the user on the display which areas of the rack assembly as shown in the image are uncleanable or cleanable may be used. In turn, step 408 may include overlaying a graphic of an avatar of the uncleanable article. In some embodiments, step 404 may include overlaying a graphic of an avatar of the cleanable article. Graphics of avatars may also be used to indicate open zones, reload positions, or areas shown in the image of the rack assembly that have space for articles to be placed therein and be in a cleanable position. For example, an arrow graphic or a circle or another graphic indicating an empty position in the rack assembly may be overlayed on a position, zone, or area identified as a place where additional articles may be added to rack assembly and be in a cleanable position. In other words, a place where articles 94 may be added to rack assembly and be washed by dishwasher appliance.

Separate from or in addition to the overlayed identifiers, step 408 may include displaying an instruction, suggestion, or message. As an example, a reload suggestion may be displayed with image 510 on the display (e.g., display 260A). The reload suggestion may be a textbox displaying reload instructions to the user. For example, as shown in FIG. 7, the reload suggestion 610 includes text to guide a user's intervention. In the case of FIG. 7, the textbox displays "Suggested reload: Move overlapping dishes in unclean zone to open zone." Other suggestions or messages may also be used. For example, a message may be displayed indicating that a suggested reload is to remove some dishes identified as uncleanable. Such may be appropriate if no open position is identified. In some embodiments, a message may be displayed indicating cleanable positions have been identified, and the message may indicate the rack assembly has been loaded in a way that all identified articles are in cleanable positions.

In embodiments wherein multiple discrete types of identifiers are provided, each identifier type may be represented by a different or unique visual motif (e.g., pattern, color, or graphic). Turning, for example, to FIGS. 6 and 7, uncleanable identifiers are indicated at 604 in a first pattern. As shown, uncleanable identifier 604 is overlayed over the presentation of image 510 at identified uncleanable articles 94A. Cleanable identifiers are indicated at 602 in a second pattern. As shown, cleanable identifiers 602 is overlayed over the presentation of image 510 at identified cleanable articles 94B. In FIG. 7, a reload identifier is indicated at 606 in a third pattern. As shown reload identifier 606 is overlayed over the presentation of image 510 at identified open position 518 (as shown in FIG. 5). Additionally or alternatively, a display of the image may be overlayed with one or more types of identifiers. For instance, as shown in FIGS. 6 and 7, different types of identifiers corresponding to the identified items may be overlayed onto the presentation of the image 510. As shown in FIG. 6, two types of identifiers, cleanable identifiers 602 and an uncleanable identifier 604 are overlayed on the presentation of image 510 on remote user device 210 via controls 260 (e.g., display screen 260A of remote user device 210). In FIG. 7, three types of identifiers are shown, including cleanable identifiers 602, uncleanable identifiers 604, and a reload identifier 606. Though FIGS. 6 and 7 show one uncleanable identifier 604 or one reload identifier 606, embodiments envisioned herein may include one or more than one identifier of each type overlayed on image 510 (e.g., a plurality of uncleanable identifiers 604 or a plurality of reload identifiers 606), based on identified articles within rack assembly 204. As shown, display 260A may be used to present image 510 to user. In some embodiments, each type of identifier may be labeled by different colors or different graphics. For example, cleanable identifiers 602 may be overlayed with a first colored hue and uncleanable identifiers 604 may be overlayed with a second colored hue. Reload identifier 606 may be overlayed with a third colored hue. Additionally or alternatively, each type of identifier may be labeled by different patterns, as shown in FIGS. 6 through 7, graphics, as discussed herein, text as discussed herein, or another visual identifier overlayed onto image 510 to indicate to a user viewing a display of image 510 with identifiers overlayed thereon which articles in the rack assembly are displayed are cleanable or uncleanable, or if an open position is available.

Still further, the method 400 at step 408 may include overlaying a first translucent colored pane highlighting in a first color onto the presentation of the image based on the identified uncleanable article (e.g., as described above). Further, at step 408, overlaying the clean identifier onto the presentation of the image based on the identified cleanable article may include overlaying a second translucent colored pane highlighting in a second color. Still further, at step 408 the method 400 may include overlaying a reload identifier in a third translucent colored pane highlighting in a third color. In other words, the identifier overlayed and displayed on the image may be a highlight feature, allowing the image to be discolored in a color over the article, position or zone identified. For example, the patterns used for identifiers 602, 604, and 606 in FIGS. 6 and 7 may be instead translucent colored pane highlighted areas of image 510. The image may be otherwise visible or unaltered other than the colored pane highlighting, or, in other words, the articles and rack assembly identified in the image remain visible, in the highlighted areas, just colored in the designated color. Thus, a user may be able to understand which areas of the rack assembly are cleanable or uncleanable or open positions for loading by the use of the identifiers, whether graphic overlays, highlights, colored identifiers, patterned identifiers, or equivalents.

In some embodiments, the identifier overlayed onto the presentation of the image is a zone identifier. For example, the identifiers 602, 604 overlayed on image 510 each cover a zone or area of rack assembly 204 shown in image 510. Identifiers 602 overlay to show cleanable zones or depict which areas of rack assembly 204 as shown in image 510 have articles 94B that are cleanable in the configuration depicted in image 510. Identifier 604 is overlayed on image 510 to show uncleanable zone 604 or depict which areas of rack assembly 204 as shown in image 510 have articles 94A that are uncleanable in the article configuration depicted in image 510. In other words, the image depicts information to user 255 that articles 94A in the uncleanable zone indicated by identifier 604 are unlikely to be cleaned by dishwasher appliance 100 if articles 94A are left in the arrangement shown in image 510. In turn, step 408 may include overlaying an uncleanable zone onto the presentation of the image based on the identified uncleanable article. In some embodiments, step 408 may include overlaying a cleanable zone (e.g., identifier 602) onto the presentation of the image based on the identified cleanable article (e.g., articles 94B).

In turn, step 408 may include displaying, a reload suggestion based on the identified open zone. For example, reload suggestion may include overlaying the identified open zone with a reload identifier 606, as shown in FIG. 7. In other words, reload identifier 606 may be displayed on an area, zone or position identified as a place in the depicted rack assembly where additional articles may be placed for correct washing during a dishwasher cycle. In certain examples, displaying the reload suggestion may follow overlaying the identifier onto the presentation of the image. As shown in FIG. 7, reload identifier 606 covers an area of the image depicting no articles 94A or 94B in that part of dishwasher assembly 204. The identified open zone in FIG. 7 may be the area of the rack assembly covered by reload identifier 606. The reload suggestion may include overlaying text onto or with the presentation of the image (e.g., image 510). In some embodiments, and as shown in FIG. 7, a textbox 610 may accompany the image to inform the user of the reload suggestion, such as to give an instruction on how to reload, including removal of at least one article 94A from rack assembly 204. Such may be the case if a rack assembly is overloaded, preventing spray assemblies 134, 140, or 142 from reaching all sides of articles 94A, 94B during cleaning cycle of dishwasher appliance 100. In some embodiments, textbox 610 may indicate an open position for the addition of more articles 94 for washing within the displayed rack assembly. In certain embodiments, textbox 610 may indicate the rack assembly displayed is correctly loaded. In some embodiments, textbox 610 may further include a key or legend identifying the types of identifiers overlayed onto the displayed image (e.g., uncleanable identifiers, cleanable identifiers, or open zone or position identifiers).

Aspects of the present subject matter are directed to a method and system for detecting dishwasher coverage using augmented reality (AR). For example, when a user loads a dishwasher, the user may have the ability to project wash coverage onto an image or stream of their loaded dishes. Embodiments disclosed herein may predict how and if certain dishes or articles will be cleaned using cameras that are strategically placed in the dishwasher or with cameras on a mobile device. Advantageously, embodiments described herein may train users to not overload dishwashers.

In some embodiments, when the dishes are loaded in the dishwasher, the users may be able to project the dishwasher coverage onto the current load. With the application of augmented reality, the users may understand which areas and zones of the dishwashers will be sprayed and cleaned and may see the effectiveness of the cycle on a current load by using cameras in the dishwasher or on a mobile device. Augmented reality may project a multicolored (e.g., a red color for uncleanable articles and a green color for cleanable articles) or multipatterned (e.g., dots for uncleanable articles and stripes for cleanable articles) wash coverage, or it may project an image of the article that is clean or dirty, depending on the identification of that article. In some embodiments, methods or systems described herein may further display the effectiveness of the load or may suggest a reload or reload options.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An article-distribution system for a dishwasher comprising a rack assembly, the article-distribution system comprising:
    a camera assembly directed at the rack assembly;
    a display screen spaced apart from the rack assembly; and
    a controller in operative communication with the camera assembly and the display screen, the controller configured to direct a dishwasher coverage operation, the dishwasher coverage operation comprising:
        receiving an image of the rack assembly from the camera assembly,
        identifying, based on the received image, an uncleanable article, the uncleanable article being in an uncleanable position within the rack assembly,
        determining, based on identifying the uncleanable article in an uncleanable position in the image, an unclean zone of the image that contains the uncleanable article;
        presenting the image at the display screen, and
        overlaying an identifier onto the presentation of the image based on the identified uncleanable article and the identified unclean zone, wherein the identifier is a zone identifier.

2. The article-distribution system of claim 1, wherein overlaying the zone identifier onto the presentation of the image comprises overlaying a graphic of an avatar of the uncleanable article.

3. The article-distribution system of claim 1, wherein the dishwasher coverage operation further comprises
    identifying, based on the received image, a cleanable article, the cleanable article being in a cleanable position within the rack assembly, and
    overlaying a clean identifier onto the presentation of the image based on the identified cleanable article.

4. The article-distribution system of claim 3, wherein overlaying the clean identifier onto the presentation of the image comprises overlaying a graphic of an avatar of the cleanable article.

5. The article-distribution system of claim 1, further comprising a dishwasher appliance comprising the rack assembly and the camera assembly.

6. The article-distribution system of claim 1, further comprising a remote user device comprising the camera assembly and the display screen.

7. The article-distribution system of claim 1, wherein the dishwasher coverage operation further comprises identifying, based on the received image, an open zone, the open zone being a location within the rack assembly sized to fit the uncleanable article, and
    displaying, following overlaying the identifier onto the presentation of the image, a reload suggestion based on the identified open zone.

8. The article-distribution system of claim 7, wherein displaying the reload suggestion comprises overlaying a reload identifier onto the presentation of the image based on the identified open zone.

9. The article-distribution system of claim 1, wherein overlaying the identifier onto the presentation of the image based on the identified uncleanable article further comprises overlaying a first translucent colored pane highlighting in a first color onto the presentation of the image based on the identified uncleanable article.

10. A method of directing a dishwasher coverage operation, the method comprising the steps of:
- receiving an image of a rack assembly from a camera assembly,
- identifying, based on the received image, an uncleanable article, the uncleanable article being in an uncleanable position within the rack assembly,
- determining, based on identifying the uncleanable article in an uncleanable position in the image, an unclean zone of the image that contains the uncleanable article;
- presenting the image at a display screen, and
- overlaying an identifier onto the presentation of the image based on the identified uncleanable article and the identified unclean zone, wherein the identifier is a zone identifier,
- wherein the camera assembly is directed at the rack assembly, and
- wherein the display screen is spaced apart from the rack assembly.

11. The method of claim 10, wherein overlaying the zone identifier onto the presentation of the image comprises overlaying a graphic of an avatar of the uncleanable article.

12. The method of claim 10, wherein the dishwasher coverage operation further comprises
- identifying, based on the received image, a cleanable article, the cleanable article being in a cleanable position within the rack assembly, and
- overlaying a clean identifier onto the presentation of the image based on the identified cleanable article.

13. The method of claim 12, wherein overlaying the clean identifier onto the presentation of the image comprises overlaying a graphic of an avatar of the cleanable article.

14. The method of claim 12, wherein overlaying the identifier onto the presentation of the image based on the identified uncleanable article further comprises overlaying a first translucent colored pane highlighting in a first color, and
- wherein overlaying the clean identifier onto the presentation of the image based on the identified cleanable article further comprises overlaying a second translucent colored pane highlighting in a second color.

15. The method of claim 10, wherein the dishwasher coverage operation further comprises identifying, based on the received image, an open zone, the open zone being a location within the rack assembly sized to fit the uncleanable article, and
- displaying, following overlaying the identifier onto the presentation of the image, a reload suggestion based on the identified open zone.

16. The method of claim 15, wherein displaying the reload suggestion comprises overlaying a reload identifier onto the presentation of the image based on the identified open zone.

* * * * *